United States Patent
Fujita et al.

(10) Patent No.: US 9,484,829 B2
(45) Date of Patent: Nov. 1, 2016

(54) POWER CONVERSION DEVICE INCLUDING NOISE SUPPRESSION CAPACITOR

(71) Applicants: FUJI ELECTRIC CO., LTD., Kawasaki-shi (JP); FUJI ELECTRIC FA COMPONENTS & SYSTEMS CO., LTD., Chuo-ku, Tokyo (JP)

(72) Inventors: Miwako Fujita, Tokyo (JP); Takashi Kaimi, Mie (JP)

(73) Assignees: FUJI ELECTRIC CO., LTD., Kawasaki-shi (JP); FUJI ELECTRIC FA COMPONETS & SYSTEMS CO., LTD., Tokyo (JP)

( * ) Notice: Subject to any disclaimer, the term of this patent is extended or adjusted under 35 U.S.C. 154(b) by 109 days.

(21) Appl. No.: 14/330,244

(22) Filed: Jul. 14, 2014

(65) Prior Publication Data

US 2014/0321171 A1 Oct. 30, 2014

Related U.S. Application Data

(63) Continuation of application No. PCT/JP2012/001487, filed on Mar. 5, 2012.

(51) Int. Cl.
*H02M 5/458* (2006.01)
*H02M 1/14* (2006.01)
(Continued)

(52) U.S. Cl.
CPC .............. *H02M 5/458* (2013.01); *H02M 1/14* (2013.01); *H02M 1/44* (2013.01); *H02M 3/337* (2013.01);
(Continued)

(58) Field of Classification Search
CPC ...... H02M 1/34; H02M 1/425; H02M 7/003; H02M 7/06; H02M 2001/348; H02M 7/48
See application file for complete search history.

(56) References Cited

U.S. PATENT DOCUMENTS 4,788,485 A * 11/1988 Kawagishi ............ H02M 1/425
  318/807
5,123,746 A *  6/1992 Okado ................ H02M 7/5387
  363/37

(Continued)

FOREIGN PATENT DOCUMENTS

DE  102004041206 A1  3/2006
JP     62-138059 A    6/1987
(Continued)

OTHER PUBLICATIONS

International Search Report issued in PCT/JP2012/001487, Mailing date Jun. 5, 2012. Please note, some references cited in ISR were previously cited in an IDS filed Jul. 14, 2014. English Translation provided.

(Continued)

*Primary Examiner* — Timothy J Dole
*Assistant Examiner* — Yusef Ahmed
(74) *Attorney, Agent, or Firm* — Rossi, Kimms & McDowell LLP

(57) ABSTRACT

A power conversion device including a power conversion portion that switches direct current voltage supplied by a positive line and negative line of a direct current power supply with a semiconductor switching element, and outputs converted voltage, is such that a plurality of interline capacitors are connected in parallel between the positive line and negative line, the capacitance of the plurality of interline capacitors is of a value that becomes smaller the nearer to the power conversion portion the position in which the interline capacitor is connected, and the capacitance of the interline capacitor with the smallest value of capacitance is set to a value greater than that of the capacitance between main electrodes when a direct current voltage is applied to the switching element used in the power conversion portion.

16 Claims, 16 Drawing Sheets

(51) Int. Cl.
*H02M 1/44* (2007.01)
*H02M 3/337* (2006.01)
*H02M 7/5387* (2007.01)
*H02M 1/34* (2007.01)
*H02M 7/00* (2006.01)

(52) U.S. Cl.
CPC .......... *H02M 7/003* (2013.01); *H02M 7/5387* (2013.01); *H02M 2001/346* (2013.01); *H02M 2001/348* (2013.01); *Y02B 70/1491* (2013.01)

(56) References Cited

U.S. PATENT DOCUMENTS

| | | | | |
|---|---|---|---|---|
| 6,091,615 | A * | 7/2000 | Inoshita | H02M 7/53873 363/132 |
| 6,181,590 | B1 * | 1/2001 | Yamane | H01L 25/162 257/E25.03 |
| 6,215,679 | B1 * | 4/2001 | Yamane | H02M 7/003 257/E25.029 |
| 6,353,545 | B1 * | 3/2002 | Ueda | H02M 1/36 323/908 |
| 6,653,806 | B1 * | 11/2003 | Ono | B60L 7/003 318/375 |
| 8,542,467 | B2 * | 9/2013 | Yamaguchi | H02M 7/003 361/18 |
| 8,705,257 | B2 * | 4/2014 | Yamaguchi | H05K 7/209 257/691 |
| 8,797,768 | B2 * | 8/2014 | Asai | H02M 1/32 363/132 |
| 2002/0034089 | A1 * | 3/2002 | Mori | H02M 5/4585 363/147 |
| 2004/0223346 | A1 * | 11/2004 | Rayner | H02M 5/458 363/37 |
| 2004/0245961 | A1 * | 12/2004 | Ueda | H02M 1/425 318/805 |
| 2007/0002594 | A1 * | 1/2007 | Otsuka | H02M 7/003 363/37 |
| 2009/0002956 | A1 * | 1/2009 | Suwa | B60L 1/003 361/728 |
| 2010/0014988 | A1 * | 1/2010 | Tsutsui | F04B 35/04 417/44.1 |
| 2010/0328975 | A1 * | 12/2010 | Hibino | H02M 7/003 363/126 |
| 2011/0094075 | A1 * | 4/2011 | Lee | B60L 11/1805 29/25.41 |
| 2011/0181993 | A1 * | 7/2011 | Yamaguchi | H02M 7/5387 361/111 |
| 2011/0292686 | A1 * | 12/2011 | Oka | H02M 1/14 363/13 |
| 2012/0106220 | A1 * | 5/2012 | Yamaguchi | H05K 7/209 363/131 |
| 2013/0056755 | A1 * | 3/2013 | Hatai | H01L 23/49805 257/77 |
| 2015/0023083 | A1 * | 1/2015 | Nakagawa | H02M 7/5387 363/132 |
| 2015/0049526 | A1 * | 2/2015 | Kagimura | H02M 1/34 363/50 |
| 2015/0288290 | A1 * | 10/2015 | Iwamoto | H02M 3/1582 363/21.06 |

FOREIGN PATENT DOCUMENTS

| | | |
|---|---|---|
| JP | 62138059 A | 6/1987 |
| JP | 01209951 A | 8/1989 |
| JP | H07-123701 A | 5/1995 |
| JP | 10-138059 A | 5/1998 |
| JP | 2000060108 A | 2/2000 |
| JP | 2000125543 A | 4/2000 |
| JP | 2004-056971 A | 2/2004 |
| JP | 2007-194006 A | 8/2007 |
| JP | 2007236137 A | 9/2007 |
| JP | 2010-041790 A | 2/2010 |
| JP | 2011067045 A | 3/2011 |
| JP | 2011177005 A | 9/2011 |

OTHER PUBLICATIONS

Kimata et al. "Smart IGBT Model and Its Application for Power Converter Design", Inudstry Applcations Society Annual Meeting, 1994., Conference Record of the 1994 IEEE, Oct. 2, 1994, pp. 1168-1173, XP010124226. Cited in EPSR issued in EP12870672.8, dated Oct. 5, 2015.

Gauen, "The Effects of MOSFET Output Capacitance in High Frequency Application", Inustry Applications Society Annual Meeting, 1989., Conference Record of the 1989 IEEE, Oct. 1, 1989, p. 1227, XP032144057. Cited in EPSR issued in EP12870672.8, dated Oct. 5, 2015.

European Search Report issued in European counterpart application No. EP12870672.8, dated Oct. 5, 2015.

Office Action issued in JP2014-503280, mailed Feb. 9, 2016. English translation provided.

Office Action issued in Japanese Application No. JP2014-503280, mailed Aug. 16, 2016 English translation provided.

* cited by examiner

POWER CONVERSION DEVICE INCLUDING NOISE SUPPRESSION CAPACITOR

CROSS-REFERENCE TO RELATED APPLICATIONS

This application is a continuation of International Application No. PCT/JP2012/001487, filed on Mar. 5, 2012, the disclosure of which, in its entirety, including the drawings, claims, and the specification thereof, is incorporated herein by reference.

FIELD OF THE INVENTION

The present invention relates to a power conversion device, and in particular, relates to technology of suppressing surge voltage and electromagnetic noise generated by the power conversion device.

BACKGROUND ART

A power conversion device configured to use a semiconductor switching element is such that a voltage surge occurring at either end of the element when switching is a considerable problem. When the semiconductor switching element is, for example, an IGBT, the voltage surge occurs between the collector and emitter (hereafter, this kind of voltage surge will be called a switching surge).

The relationship between a collector-to-emitter voltage Vce occurring when switching the IGBT and a collector current Ic is as shown in, for example, the schematic view of FIG. 18. As can be seen from the drawing, a leap in the collector-to-emitter voltage Vce when turning off (a switching surge) and a leap in the collector current Ic when turning on occur in the power conversion device. Further, when the switching surge exceeds the breakdown voltage of the semiconductor switching element, it may lead to element destruction, which has a considerable effect on the reliability of the power conversion device.

Also, the sharp changes in voltage and current caused when switching, and a resonance phenomenon occurring in accompaniment to the sharp changes, cause a high level of noise, resulting in conduction noise conducted to the power supply system, and radiation noise propagated to a space on the periphery of the power conversion device and a cable connected to the device. There is a demand to reduce the conduction noise and radiation noise so as not to cause peripheral instruments to malfunction. For example, regulation values of 150 kHz to 30 MHz for conduction noise and 30 MHz to 1 GHz for radiation noise are stipulated by the International Electrotechnical Commission (IEC).

A power conversion device shown in FIG. 19 is a schematic circuit diagram showing a main portion of a motor drive circuit. The motor drive circuit shown in the diagram is such that a converter 2, which converts alternating current voltage provided from a 3-phase alternating current power supply 1 into direct current voltage and outputs the direct current voltage, and a smoothing capacitor Cdc, which stabilizes the direct current voltage output from the converter 2, are connected between a positive line 6 and a negative line 7, which are direct current power supply lines. Furthermore, the motor drive circuit includes an inverter 3, which receives the direct current voltage stabilized by the smoothing capacitor Cdc and outputs a 3-phase alternating current voltage of an arbitrary frequency. Further, the 3-phase alternating current voltage output from the inverter 3 is provided to a motor M, whereby a desired rotation speed is obtained.

Specifically, the converter 2 is such that three series circuits (D1 and D4, D2 and D5, and D3 and D6), wherein two rectifier diodes are connected in series, are connected in parallel, and alternating current voltage provided from the 3-phase alternating current power supply 1 is converted to direct current voltage. Also, the inverter 3 is configured of three series circuits (S1 and S4, S2 and S5, and S3 and S6), wherein two IGBTs are connected in series, connected in parallel. The inverter may also be configured using, for example, a so-called 2-in-1 type power module wherein two switching elements are connected in series, a 6-in-1 type power module wherein six switching elements are connected in a bridge, or a PIM (Power Integrated Module) wherein a converter circuit wherein six rectifier diodes are connected in a bridge and an inverter circuit wherein six switching elements are connected in a bridge are packaged. Also, the inverter 3 is, for example, PWM controlled by an unshown control circuit.

Herein, Lp1, Lp2, Lp3, Ldcp, Ldcn, Ln1, Ln2, and Ln3 in FIG. 19 are line inductors that exist in printed patterns or bus bars configuring the direct current power supply lines of the converter and inverter, and are a main cause of switching surge occurring. Although the line inductors Lp1, Lp2, Lp3, Ldcp, Ldcn, Ln1, Ln2, and Ln3 are not depicted in a normal circuit diagram, they exist due to the structure of the heretofore described power conversion device and the like.

Further, the larger the values of the line inductors, the larger the switching surge becomes. This is because, when the IGBTs (S1 to S6) are turned off in the circuit of FIG. 19, current flowing through the line inductors loses a conductive path.

As a general countermeasure for suppressing this kind of switching surge, there is a method whereby a snubber circuit is connected. The snubber circuit performs a role of absorbing energy accumulated in the line inductors, thereby suppressing the switching surge. FIG. 20 is such that a snubber capacitor Cs is connected between the positive line 6 and negative line 7, which are direct current power supply lines, in the power conversion circuit shown in FIG. 19. In the drawing, the line inductors Lp1 and Ln1 are included in a printed pattern or bus bar between the smoothing capacitor Cdc and snubber capacitor Cs.

Line inductors Lsp and Lsn, in which the inductance of the snubber capacitor Cs's own lead and the inductance of a connected printed pattern or bus bar are combined, are included in the snubber capacitor Cs.

Alternatively, as another general countermeasure for suppressing the switching surge, although not particularly shown in the drawings, there is a countermeasure whereby a snubber circuit, wherein a parallel circuit configured of a diode and resistor is connected in series with a capacitor, is connected in parallel with the switching elements. However, even when adding this kind of snubber circuit, it is often the case that it is difficult to sufficiently reduce conduction noise and radiation noise.

For example, referring to the switching waveforms shown in FIG. 18, it is the peak voltage of the switching surge that is the cause of element destruction when the IGBT is turned off. Meanwhile, it may happen that the switching surge, not converging immediately after the peak value, resonates and oscillates. This resonance phenomenon may also be observed in the current when turning on.

Although this kind of resonance phenomenon is not a cause of element destruction, it is a cause of the occurrence of noise that causes an extremely high value in a frequency spectrum, as shown in FIG. 21, and results in the occurrence of large radiation noise or conduction noise. Also, the main causes of the resonance phenomenon are parasitic capacitance of circuit elements of the snubber circuit, or the like, added in order to suppress switching surge, and of the switching elements themselves, and resonance caused by line inductance or the like in the periphery of the switching elements. A method whereby a series circuit wherein a capacitor and resistor are connected in series is connected in parallel with a direct current power supply line having line inductance has been tried as a method of reducing high level conduction noise or radiation noise occurring due to this kind of resonance phenomenon, for example, as disclosed in Japanese patent document JP-A-2010-41790.

However, a power conversion device described in JP-A-2010-41790 is such that there is also parasitic inductance in the capacitor connected in parallel to the direct current power supply line, and there is concern that the value of that inductance is generally greater than the inductance value of the direct current power supply line with which the capacitor is connected in parallel. At this time, series resonance due to the capacitor and the parasitic inductance of the capacitor occurs at a frequency lower than a frequency at which it is hoped that parallel resonance of the direct current power supply line and capacitor will occur. Therefore, as the capacitor acts as parasitic inductance at the parallel resonance frequency, the envisaged parallel resonance of the capacitor and direct current power supply line does not occur. Because of this, it is difficult to reduce the high level conduction noise and radiation noise.

SUMMARY OF INVENTION

Embodiments of the invention provide a power conversion device such that it is possible to realize both a suppression of switching surge and a countermeasure to noise in a power conversion device having a semiconductor switching element.

In an embodiment, a power conversion device of the invention includes a power conversion portion that switches direct current voltage supplied by a positive line and negative line of a direct current power supply with a semiconductor switching element, and outputs converted voltage, the power conversion device being characterized by including a smoothing capacitor, connected between the positive line and negative line, that smoothes the direct current voltage of the direct current power supply lines, and a snubber capacitor, connected between the positive line and negative line, that suppresses surge voltage generated when the power conversion portion switches, wherein at least one interline capacitor is connected between the positive line and negative line between the snubber capacitor and power conversion portion, the capacitance of the interline capacitor is of a value that becomes smaller the nearer to the power conversion portion the position in which the interline capacitor is connected, and the capacitance of the interline capacitor with the smallest value of capacitance is of a value greater than that of the capacitance between main electrodes when a direct current voltage is applied to the switching element used in the power conversion portion.

In the heretofore described power conversion device, an IGBT is used as the semiconductor switching element in the power conversion portion. Further, a noise suppression capacitor whose capacitance is smaller than that of the snubber capacitor, and which has a capacitance larger than the output capacitance between main electrodes (between the collector and emitter) of the IGBT, being included as the interline capacitor, there is a reduction in conduction noise and radiation noise components accompanying series resonance occurring in the direct current power supply line portion and power conversion portion.

The heretofore described power conversion device may also be configured as a parallel circuit of the smoothing capacitor and noise suppression capacitor, omitting the snubber capacitor, or alternatively, the power conversion device may also be configured as a parallel circuit of the snubber capacitor and noise suppression capacitor, omitting the smoothing capacitor.

Also, in another embodiment, a plurality of one of an interline capacitor, a series circuit wherein an interline capacitor and a resistor are connected in series, or a parallel circuit wherein an interline capacitor and a resistor are connected in parallel, are connected in parallel between the positive line and negative line, the capacitance of the interline capacitor is of a value that becomes smaller the nearer to the power conversion portion the position in which the interline capacitor is connected, and the capacitance of the interline capacitor with the smallest value of capacitance is of a value greater than that of the capacitance between main electrodes when a direct current voltage is applied to the switching element used in the power conversion portion.

The heretofore described power conversion device is such that, as a resistor is connected in series with the interline capacitor (noise suppression capacitor), it is possible to effectively attenuate noise accompanying series resonance with the resistor.

In another embodiment, the power conversion device is such that a semiconductor module wherein a plurality of semiconductor elements are packaged is used as the power conversion portion of the invention, and is characterized in that a plurality of one of an interline capacitor, a series circuit wherein an interline capacitor and a resistor are connected in series, or a parallel circuit wherein an interline capacitor and a resistor are connected in parallel, are connected in parallel between the positive line and negative line, the interline capacitor, series circuit, or parallel circuit among these connected nearest to the power conversion portion is configured inside the semiconductor module, the capacitance of the interline capacitor is of a value that becomes smaller the nearer to the switching elements in the semiconductor module the position in which the interline capacitor is connected, and the capacitance of the interline capacitor with the smallest value of capacitance is of a value greater than that of the capacitance between main electrodes when a direct current voltage is applied to the switching elements used in the power conversion portion.

The heretofore described power conversion device is such that a noise suppression capacitor and a resistor connected in series with the capacitor can be configured in a semiconductor module, and a compact and effective suppression of noise is thus possible, without the noise suppression capacitor and resistor being connected to a wiring pattern or bus bar.

Also, other than an inverter that converts an input direct current voltage into alternating current voltage and outputs the alternating current voltage, the power conversion portion may also be configured of a direct current chopper, or the like, that converts an input direct current voltage into another direct current voltage by switching, and outputs the other direct current voltage.

The power conversion device of the invention is such that conduction noise and radiation noise components accompanying series resonance occurring in the direct current power supply line portion and power conversion portion are reduced by parallel resonance occurring because of the capacitance components of the interline capacitor, the parasitic inductance components of the snubber capacitor, and the inductance components of the peripheral direct current power supply lines. Also, the power conversion device of the invention is such that, by the snubber capacitor and interline capacitor being added, the impedance of the direct current power supply lines is smaller than that in a heretofore known power conversion device, and the switching surge does not worsen.

Because of this, the power conversion device of the invention is such that it is possible to simultaneously realize a suppression of switching surge and a suppression of radiation noise and conduction noise, which has considerable advantages from a practical perspective.

DESCRIPTION OF ILLUSTRATED EMBODIMENTS

Figure 20:
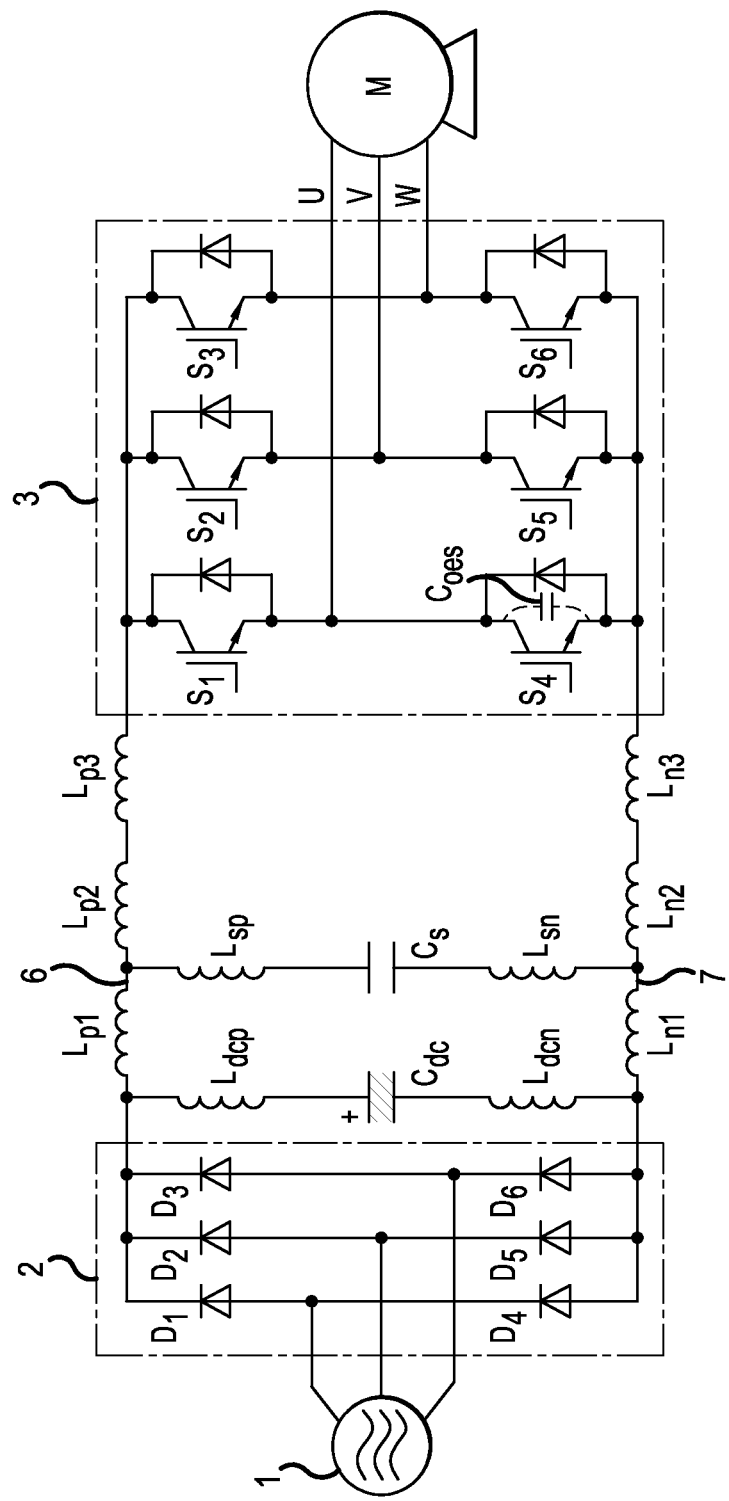
FIG. 20 is a circuit diagram showing a configuration wherein a snubber capacitor is connected to the power conversion device shown in FIG. 16.

Hereafter, a description will be given, while referring to the attached drawings, of a power conversion device according to an embodiment of the invention. FIG. 1 to FIG. 17 being drawings exemplifying the embodiment of the invention, the invention is not limited by these drawings. Also, configuration components the same as those in a heretofore known power conversion device shown in FIG. 20 are given the same reference signs, and a description thereof will be omitted.

Example 1

Figure 1:
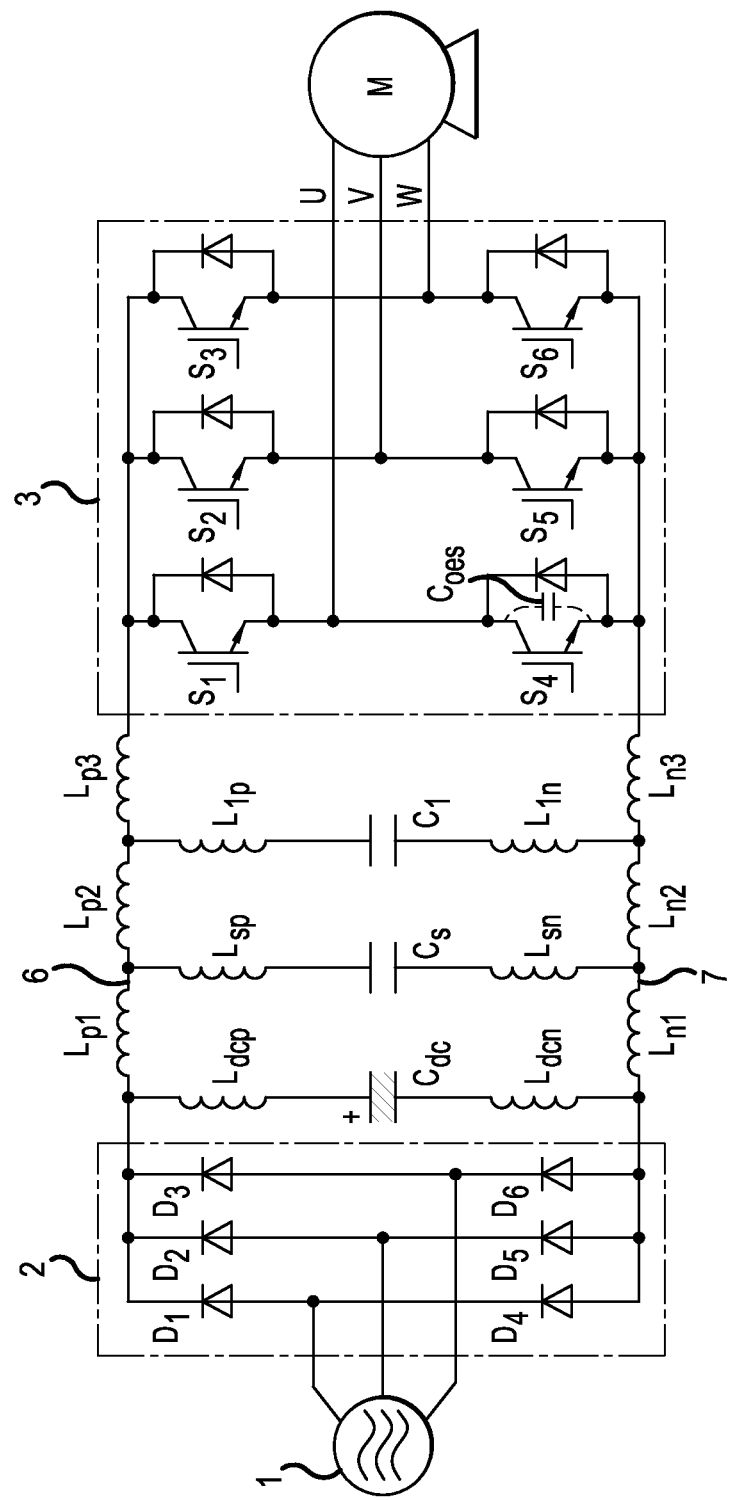
FIG. 1 is a circuit diagram showing a configuration of a power conversion device according to an Example 1 of the invention.

FIG. 1 is a circuit diagram showing a configuration of a power conversion device according to an Example 1 of the invention. Example 1 differs from the heretofore known power conversion device shown in FIG. 20 in that a noise suppression capacitor (interline capacitor) C1 that suppresses conduction noise and radiation noise is included between a snubber capacitor Cs between a positive line 6 and negative line 7, which are direct current power supply lines, and an inverter 3, and that the capacitance of the noise suppression capacitor C1 is of a value smaller than that of the capacitance of the snubber capacitor Cs, and of a value greater than that of a capacitance Coes (output capacitance) between main electrodes (between a collector and an emitter) of semiconductor switching elements (IGBTs; S1 to S6) used in the inverter 3.

A film capacitor may be used as the snubber capacitor Cs, and a ceramic capacitor may be used as the noise suppression capacitor C1.

Herein, as a main resonance phenomenon that causes an occurrence of high level conduction noise or radiation noise generated by the heretofore known power conversion device, there is serial resonance occurring between the direct current power supply lines 6 and 7, including the snubber capacitor Cs, and the inverter 3 (for example, in FIG. 20, serial resonance occurring between line inductors Lp2, Lp3, Lsp, Lsn, Ln2, and Ln3 and the snubber capacitor Cs and the collector-to-emitter capacitance (output capacitance) Coes when the IGBT (S1) switches).

By including the snubber capacitor Cs and noise suppression capacitor C1, the previously described conduction noise and radiation noise components accompanying serial resonance occurring in the direct current power supply line portion and power conversion portion are reduced. That is, the power conversion device of the invention is such that the noise components are reduced by a new parallel resonance occurring in a capacitance component of the noise suppression capacitor C1 and in parasitic (line) inductance components (Lsp and Lsn) of the snubber capacitor Cs or inductance components (Lp2, Ln2) of the peripheral direct current power supply lines.

Also, the power conversion device of the invention is such that, by the snubber capacitor Cs and noise suppression capacitor C1 being added, the impedance of the direct current power supply lines is small with respect to that in the heretofore known power conversion device. Consequently, there is no worsening of switching surge.

Before giving a more detailed description of a specific circuit configuration and advantages of the power conversion device according to Example 1 of the invention, a description will be given, while referring to FIG. 20, of the heretofore known power conversion device.

For example, in order to obtain an object of a voltage suppression effect, a film capacitor having capacitance in the region of several hundred nF is used as the snubber capacitor Cs. Inductors in the region of several tens of nH corresponding to series connection components such as parasitic inductance components (Lsp and Lsn) in the region of several tens of nH in the snubber capacitor, inductance components in the region of several tens of nH in an unshown power module including a switching element, or inductance components (Lp2, Lp3, Ln2 and Ln3) of several tens of nH in the direct current power lines occurring in relation to the dimensions or mounting of the film capacitor, are included between the snubber capacitor and a power conversion portion.

Figure 21:
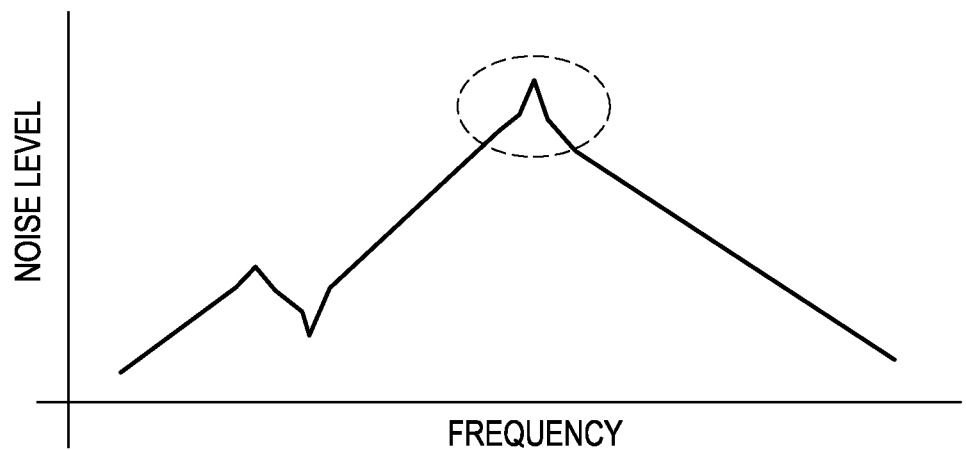
FIG. 21 is a diagram showing an example of noise level in the heretofore known power conversion device.

Also, the switching element has a capacitance component (output capacitance Coes) in the region of, for example, several hundred pF. Therefore, parallel resonance is generated in a frequency band of several MHz by the inductance components in the region of several tens of nH and the capacitance component in the region of several hundred pF of the switching element, and high level noise peaking at a specific frequency occurs, as shown in a region indicated by, for example, a broken line in FIG. 21.

Continuing, a description will be given, while referring to FIG. 1, of a circuit configuration of the power conversion device of the invention. The noise suppression capacitor C1, whose capacitance is of a value smaller than that of the capacitance of the snubber capacitor Cs in the heretofore known power conversion device shown in FIG. 20, and whose capacitance is of a value greater than that of the output capacitance Coes of the IGBTs (S1 to S6) configuring the inverter 3, is added to the power conversion device according to Example 1 of the invention shown in FIG. 1.

A ceramic capacitor with a capacitance in the region of, for example, five times the output capacitance Coes, is used as a specific capacitance of the noise suppression capacitor C1. Therefore, the noise suppression capacitor C1 is such that parallel resonance occurs between the parasitic inductors Lsp and Lsn of the snubber capacitor Cs and the series inductance component of the inductors Lp2 and Ln2 of the direct current power supply lines 6 and 7 between the snubber capacitor Cs and noise suppression capacitor C1, and the parallel resonance frequency is in a band of several MHz. Consequently, the power conversion device according to Example 1 of the invention is such that it is possible to reduce the noise components generating high level noise due to the previously described series resonance.

Figure 2:
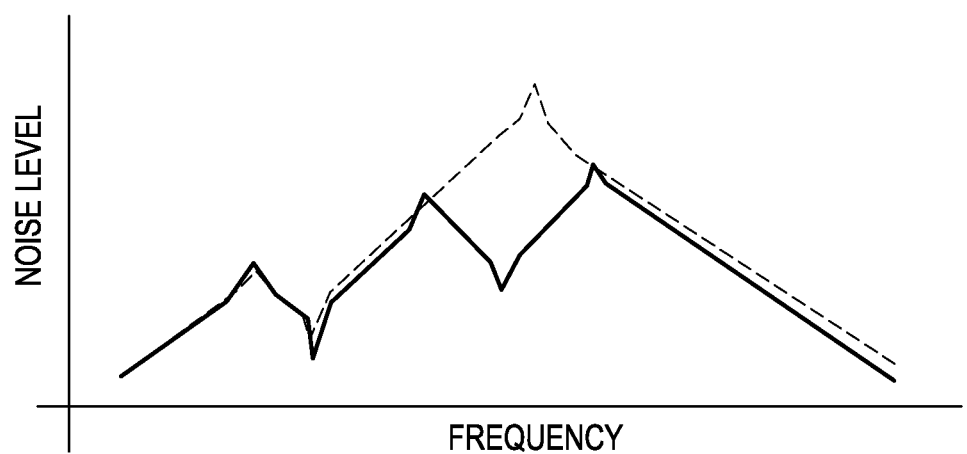
FIG. 2 is a diagram showing an example of a result of a theoretical estimate (relative values) of the noise levels of the power conversion device of the invention and a heretofore known power conversion device.
Figure 3:
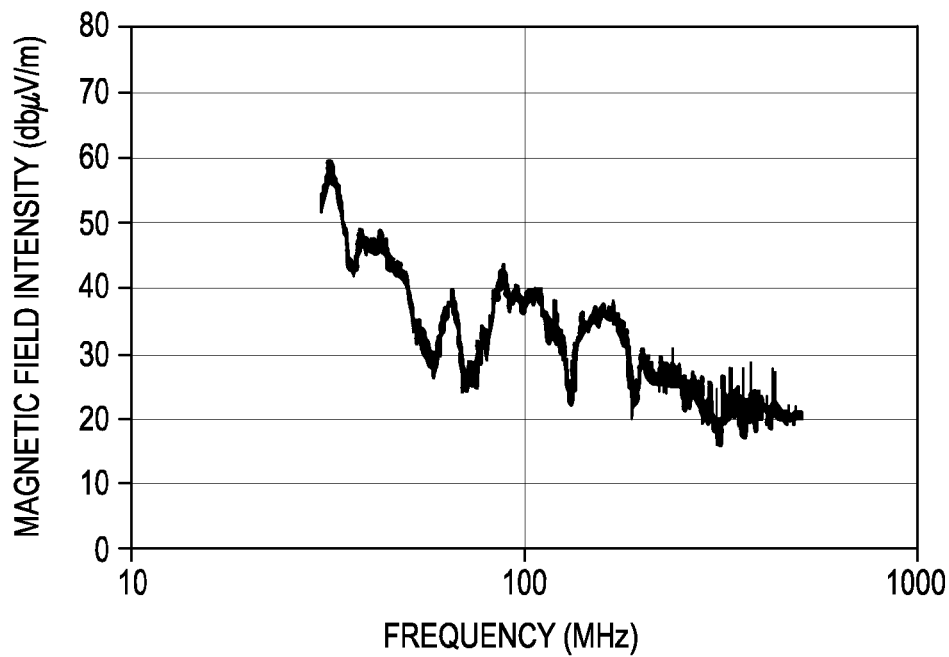
FIG. 3 is a diagram showing a result of actual measurement of a noise frequency spectrum distribution (electrical field intensity) when there is only a snubber capacitor.
Figure 4:
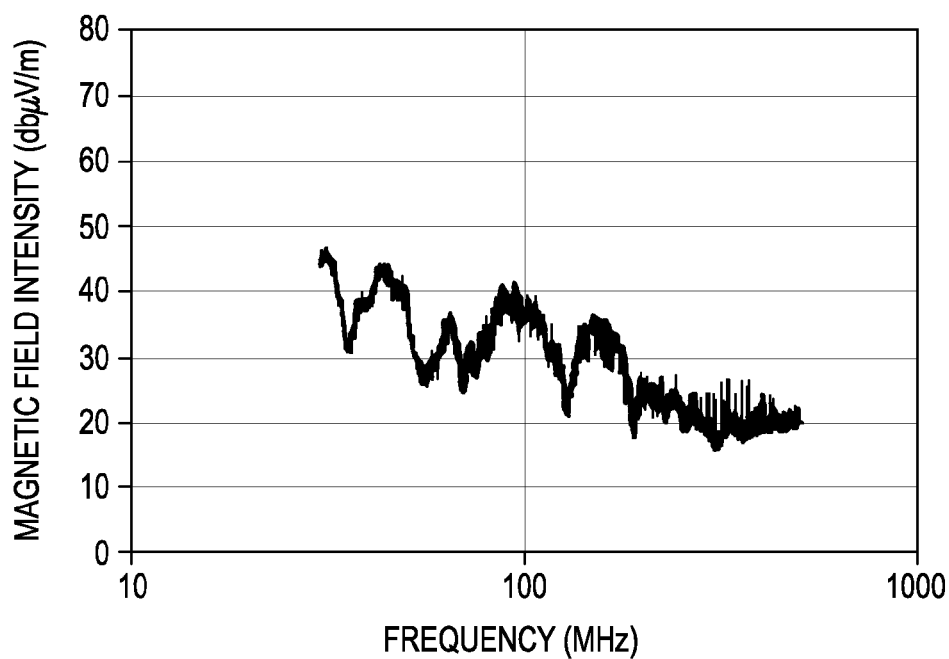
FIG. 4 is a diagram showing a result of actual measurement of a noise frequency spectrum distribution (electrical field intensity) when a snubber capacitor and noise suppression capacitor are connected.

An example of a result of a theoretical estimate (relative values) of the noise levels of the power conversion device of the invention and the heretofore known power conversion device is shown in FIG. 2 as a result of theoretically computing the noise reduction effect. In this drawing, the solid line is a noise frequency spectrum of the power conversion device of the invention, while the broken line is a noise frequency spectrum of the heretofore known power conversion device. Also, a noise frequency spectrum when there is only the snubber capacitor Cs is shown in FIG. 3, and an actual measurement result wherein the noise reduction effect when the noise suppression capacitor C1 is connected in parallel with the snubber capacitor Cs is examined with actual equipment is shown in FIG. 4. From these drawings, it can be confirmed that a high noise reduction effect is obtained with the invention.

In the heretofore described embodiment, a description has been given of a power conversion device wherein IGBTs are used as the switching elements, but the power conversion device may, of course, be configured using self arc-extinguishing devices such as MOSFETs in place of the IGBTs. Also, a power module such as a 2-in-1 type wherein two switching elements are connected in series or a 6-in-1 type wherein six switching elements are connected in a bridge is used for the semiconductor switching elements configuring the inverter 3, but a PIM wherein a converter circuit wherein six rectifier diodes are connected in a bridge and an inverter circuit wherein six switching elements are connected in a bridge are packaged can also be applied to the power conversion device of the invention.

Also, although the noise suppression capacitor C1 and snubber capacitor Cs are each shown as one element in the circuit diagram, the configuration may also be such that a plurality of capacitors are connected in parallel or connected in series.

Figure 5:
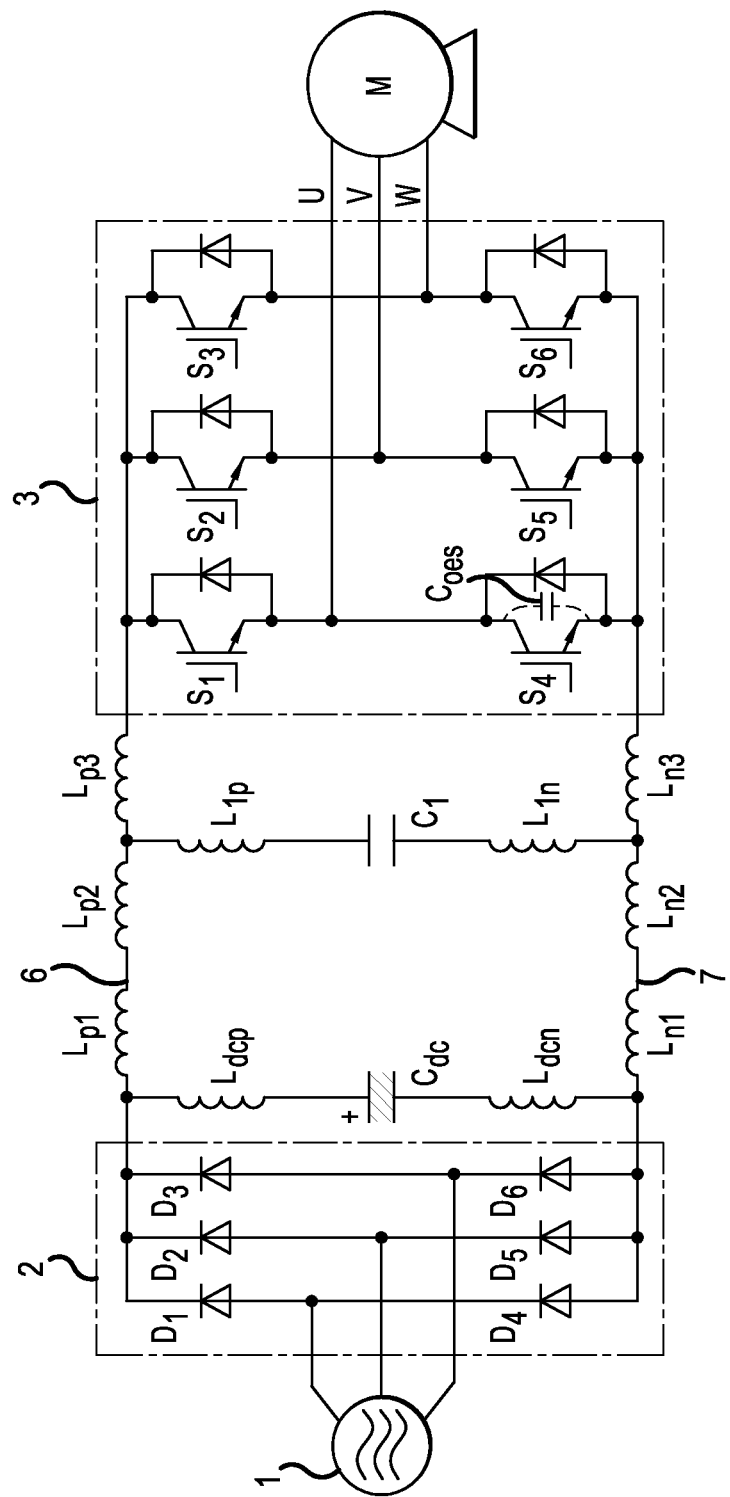
FIG. 5 is a circuit diagram showing a modification example of the power conversion device according to Example 1 of the invention.
Figure 6:
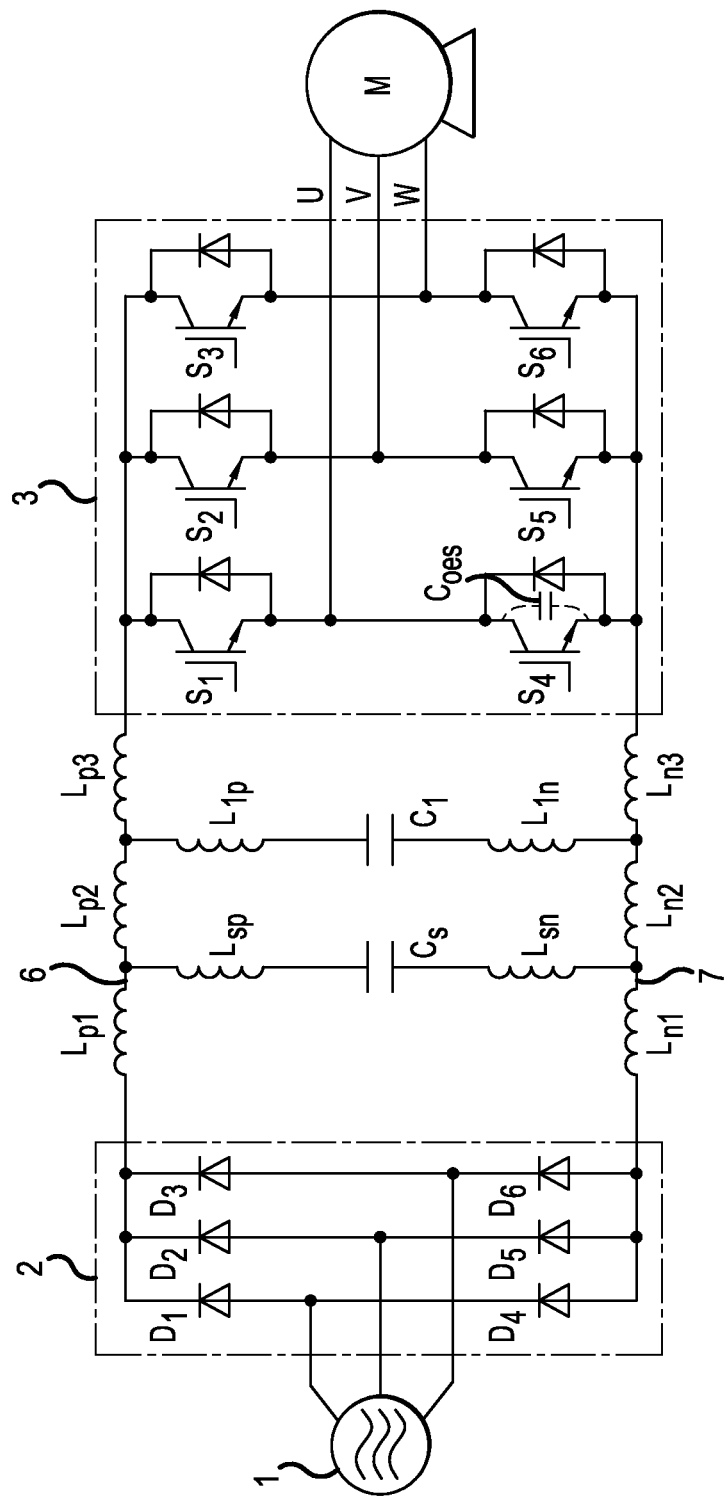
FIG. 6 is a circuit diagram showing another modification example of the power conversion device according to Example 1 of the invention.

Alternatively, the invention can also of course be applied to a power conversion device wherein no snubber capacitor Cs is used, as shown in a modification example of FIG. 5, or to a power conversion device wherein no smoothing capacitor Cdc is used, as shown in another modification example of FIG. 6.

Figure 7:
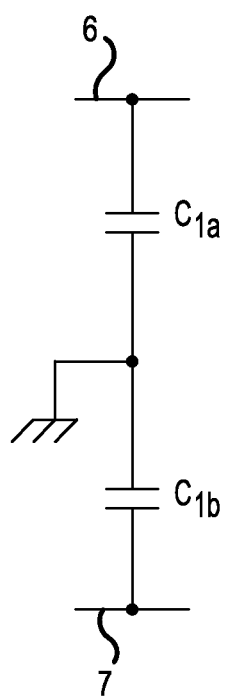
FIG. 7 is a main portion circuit diagram showing an example wherein the noise suppression capacitor is changed.

A noise suppression capacitor in the power conversion device of the invention may be such that a series circuit wherein two capacitors C1a and C1b are connected in series is connected between the positive line and negative line, and a connection point of the capacitors C1a and C1b is grounded, as shown in FIG. 7. At this time, it is sufficient that the composite capacitance of the capacitors C1a and C1b satisfies the heretofore described conditions.

Furthermore, although not particularly shown in the drawings, the noise suppression capacitor C1 may also be connected in the immediate vicinity of a connection point of each of the direct current lines 6 and 7 in the leg formed of the switching elements S1 and S4 in, for example, FIG. 1.

That is, it is sufficient that the power conversion device of the invention is such that the capacitance of the noise suppression capacitor is a capacitance of a value that becomes smaller the nearer to the power conversion portion the position in which the noise suppression capacitor is connected, and that the capacitance of the noise suppression capacitor with the smallest value of capacitance is of a value greater than that of the capacitance between the main electrodes when a direct current voltage is applied to the switching elements used in the power conversion portion.

Example 2

In the circuit configuration of Example 1 of the invention shown in FIG. 1, series resonance is generated in a series circuit formed of inductance components, being parasitic inductance components (L1p and L1n) included in the noise suppression capacitor C1, the inductance components (not shown) in the power module, and the inductance components (Lp3 and Ln3) of the direct current power supply lines 6 and 7, and of the capacitance components, being the output capacitance Coes of the IGBTs (S1 to S6) and the noise suppression capacitor C1. Noise exceeding a desired noise level may occur in accompaniment to the series resonance.

Figure 8:
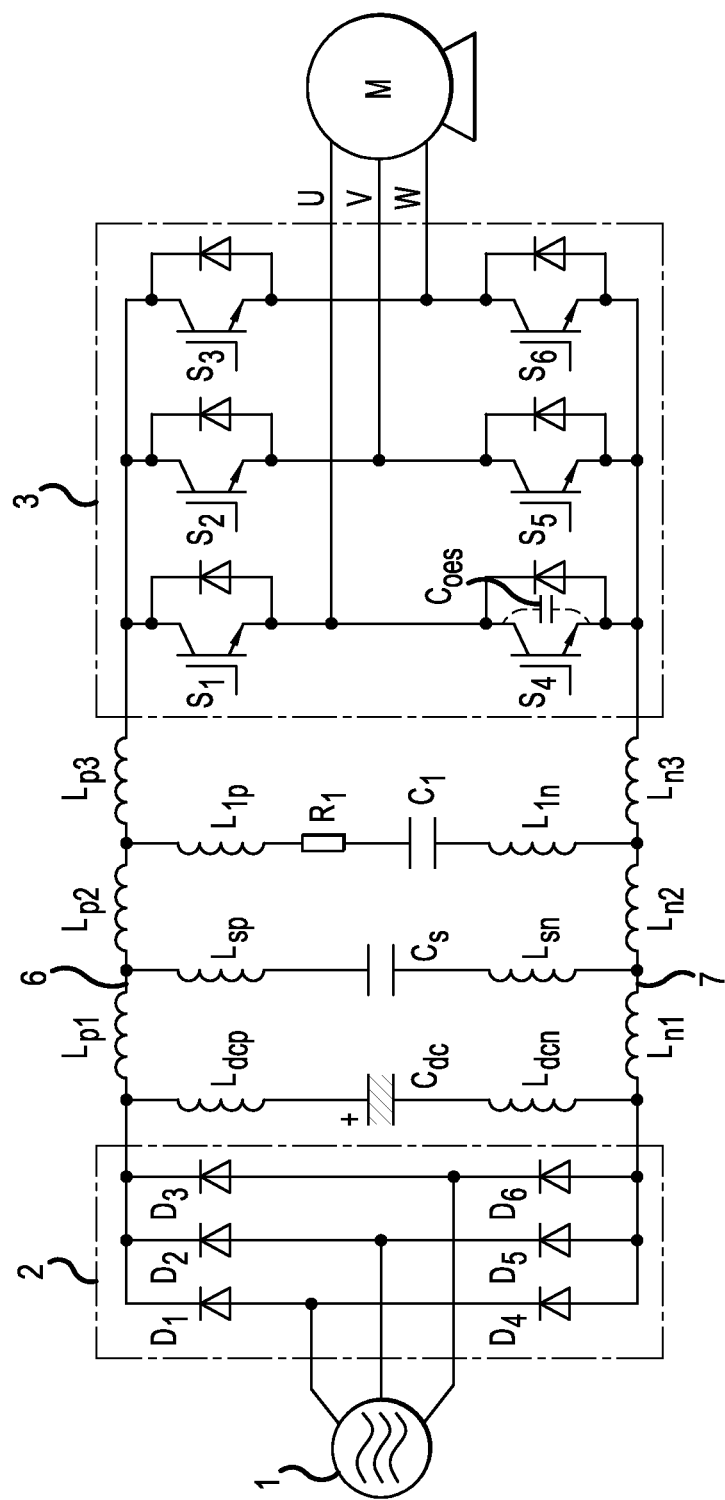
FIG. 8 is a circuit diagram showing a configuration of a power conversion device according to an Example 2 of the invention.

In this case, it is good when a resistor R1 is connected in series with the noise suppression capacitor C1, and the series circuit is connected between the power supply lines 6 and 7 nearest to the inverter 3, as depicted in a circuit diagram showing an Example 2 of the invention in FIG. 8. By adopting this kind of circuit configuration, it is possible to effectively reduce the previously described noise accompanying series resonance. Also, although not particularly shown in the drawings, it is also possible to obtain a noise reduction effect by connecting the resistor R1 in parallel with the noise suppression capacitor C1.

Example 3

Figure 9:
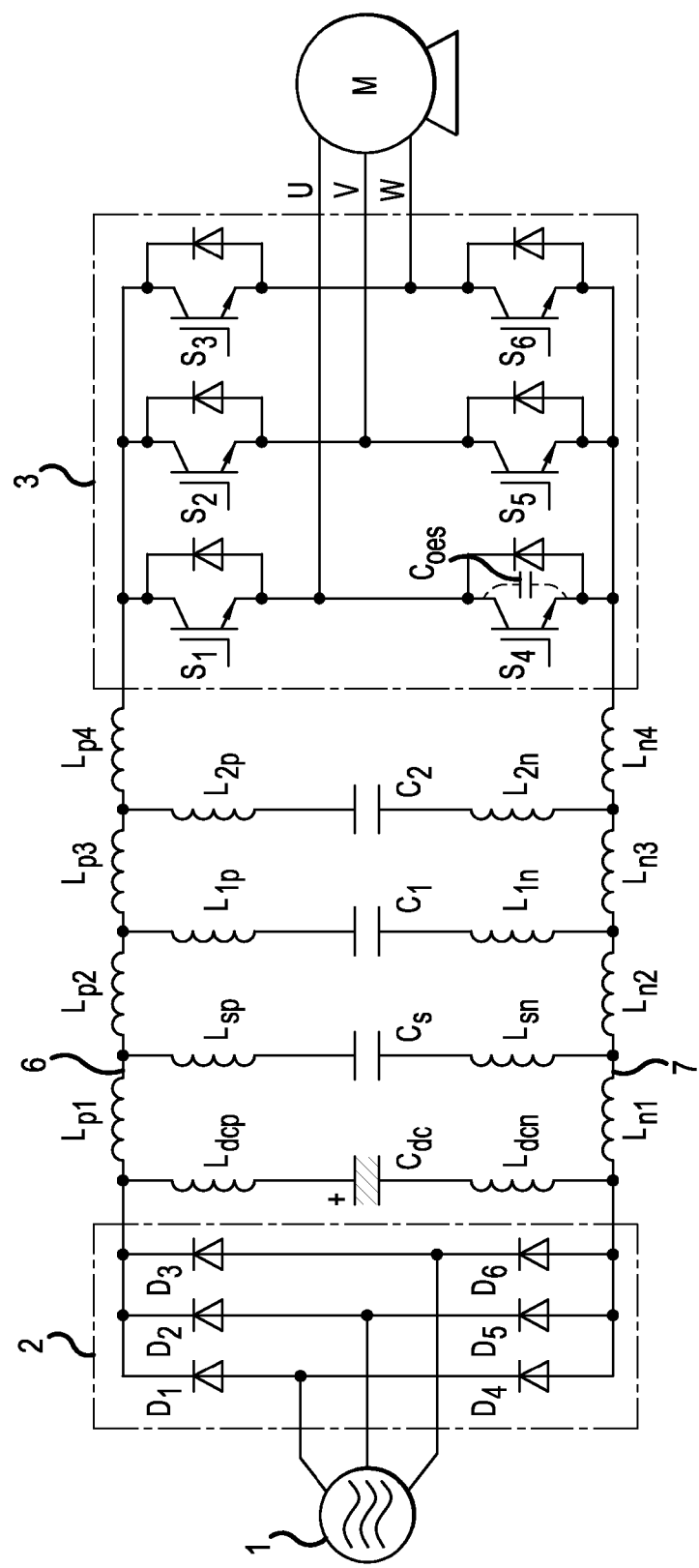
FIG. 9 is a circuit diagram showing a configuration of a power conversion device according to an Example 3 of the invention.

Example 3 differs from Examples 1 and 2 in that, as shown in FIG. 9, the noise suppression capacitor C1, which has capacitance of a value smaller than that of the capacitance of the snubber capacitor Cs and greater than the output capacitance Coes of the IGBTs (S1 to S6) configuring the power conversion portion, and another noise suppression capacitor C2, which has capacitance of a value smaller than that of the noise suppression capacitor C1 and capacitance greater than the output capacitance Coes of the IGBTs (S1 to S6), are connected between the direct current power supply lines 6 and 7. That is, the circuit configuration is such that the plurality of noise suppression capacitors C1 and C2, whose capacitance becomes smaller the nearer they are to the switching elements configuring the power conversion portion and whose capacitance becomes larger the nearer they are to the snubber capacitor Cs, are connected between the direct current power supply lines 6 and 7.

By so doing, parallel resonance occurs between the parasitic inductors (L1p, L1n) of the noise suppression capacitor C1, the series inductance component of the inductors (Lp3, Ln3) of the direct current power supply lines 6 and 7 between the noise suppression capacitors C1 and C2, and the noise suppression capacitor C2, in addition to the parallel resonance described in Example 1, and it is thus possible to obtain a higher noise reduction effect.

Although the power conversion device according to Example 3 of the invention shown in FIG. 9 is such that two capacitors, the noise suppression capacitors C1 and C2, are connected in parallel, a larger number of capacitors may be connected in parallel. That is, the power conversion device of the invention being such that it is sufficient that the capacitance and number of capacitors connected in parallel is set so that an optimum noise suppression effect is obtained, the number of capacitors connected in parallel is not limited. Also, ceramic capacitors may be applied as the noise suppression capacitors.

Example 4

Figure 10:
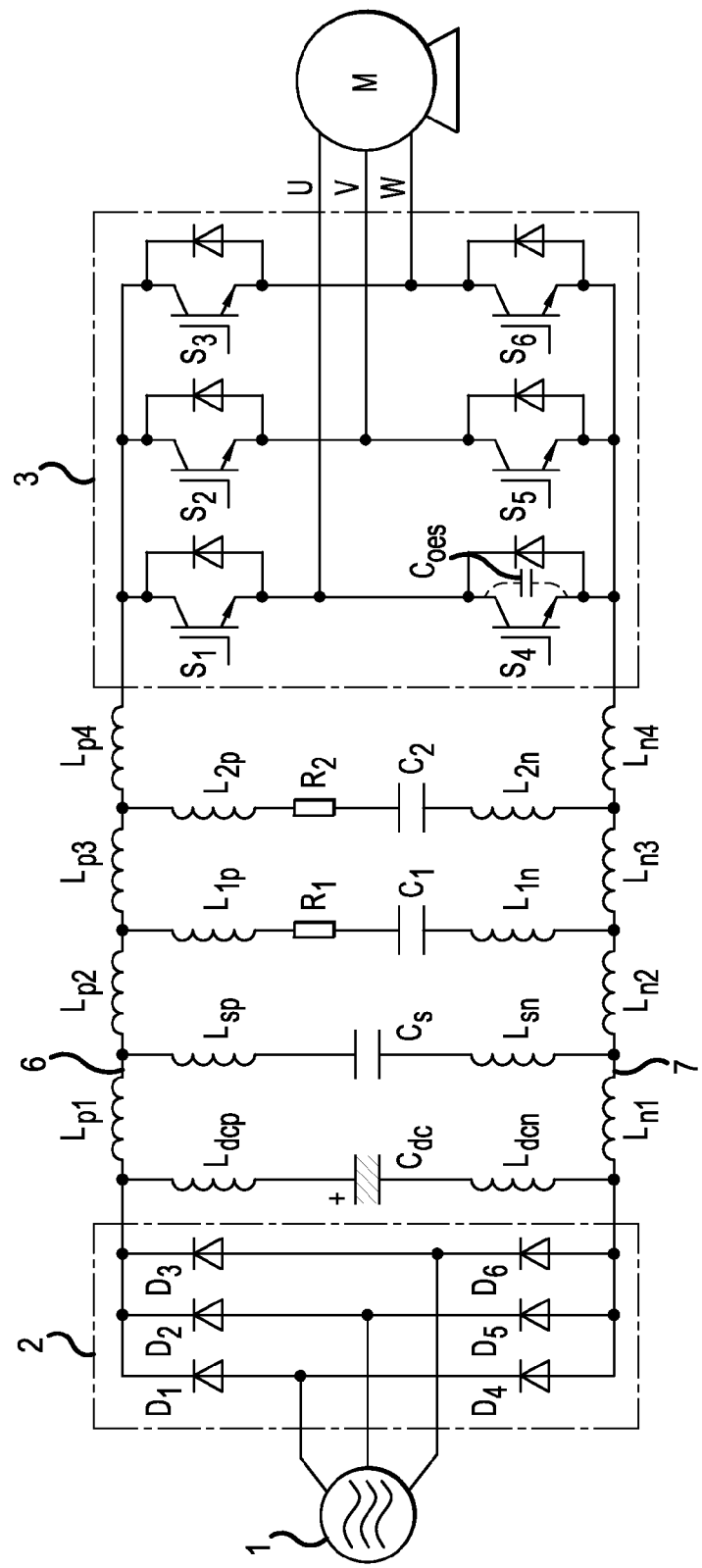
FIG. 10 is a circuit diagram showing a configuration of a power conversion device according to an Example 4 of the invention.

A description will be given, while referring to FIG. 10, of a power conversion device according to an Example 4 of the invention.

Example 4 differs from Example 3 in that the circuit is such that resistors R1 and R2 are connected in series to the noise suppression capacitors C1 and C2 respectively, as described in Example 2.

The power conversion device according to Example 4 of the invention for which this kind of configuration is adopted is such that it is possible, with the resistors R1 and R2, to effectively reduce noise components accompanying series resonance generated by the addition of the noise suppression capacitors C1 and C2.

As a modification example of Example 4, although not particularly shown in the drawings, the circuit configuration may also be such that the resistors R1 and R2 are connected in parallel with the noise suppression capacitors C1 and C2.

Example 5

Figure 11:
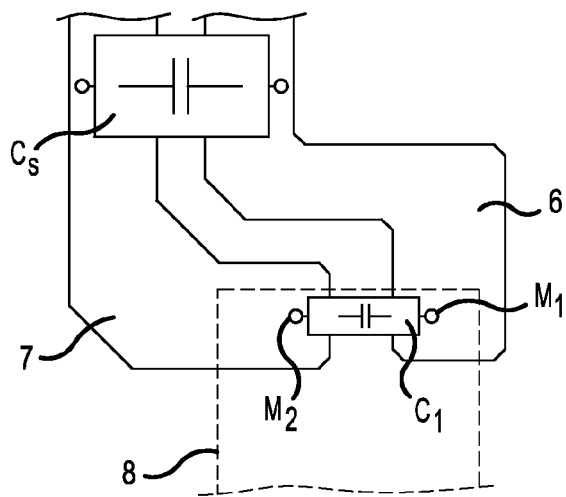
FIG. 11 is a diagram showing an example of the disposition of an IGBT module, noise suppression capacitor, and snubber capacitor mounted on a printed wiring substrate.

Next, a description will be given of an example of an implementation realizing the power conversion device of the invention. FIG. 11, which is a diagram showing an Example 5 of the invention, shows a case of printed patterns wherein the direct current power supply lines 6 and 7 are formed on a printed substrate. In the diagram, the IGBTs (S1 to S6) packaged inside one power module 8 are disposed on the back surface of the substrate. Direct current terminals M1 and M2 of the power module are connected respectively to the printed patterns of the direct current power supply lines 6 and 7 formed on the printed substrate. The noise suppression capacitor C1 is mounted in the vicinity of the direct current terminals M1 and M2 on the direct current power supply lines 6 and 7.

The capacitance of the noise suppression capacitor C1 is of a value smaller than that of the capacitance of the snubber capacitor Cs, and of a value greater than that of the capacitance Coes (output capacitance) between the main electrodes (collector-to-emitter) of the semiconductor switching elements (IGBTs; S1 to S6), as described in Examples 1 to 4.

By the noise suppression capacitor C1 and snubber capacitor Cs being mounted as heretofore described, it is possible to reduce noise components. Also, as the impedance of the direct current power supply lines is small with respect to that of the heretofore known power conversion device, there is no worsening of switching surge.

Although not particularly shown in the drawings, it is sufficient that Examples 2 to 4 too are mounted on a printed substrate, as in Example 5.

Example 6

Figure 12:
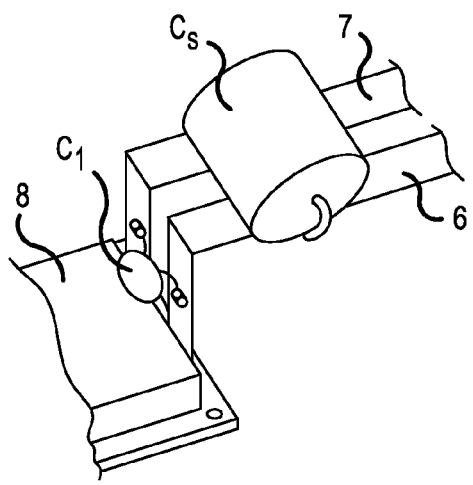
FIG. 12 is a perspective view showing an example of the attachment of the noise suppression capacitor and snubber capacitor connected to a bus bar attached to an IGBT module.

FIG. 12 is a diagram showing an example of a case wherein the direct current power supply lines 6 and 7 are configured as bar lines.

In Example 6, too, the noise suppression capacitor C1 and snubber capacitor Cs are each mounted by, for example, screwing or the like on bar lines B1 and B2, the noise suppression capacitor C1 in the vicinity of a place in which the bar lines B1 and B2 configuring the direct current power supply lines 6 and 7 are connected to the power module 8, and the snubber capacitor Cs in a place further removed than the connection place.

The capacitance of the noise suppression capacitor C1 is of a value smaller than that of the capacitance of the snubber capacitor Cs, and of a value greater than that of the capacitance Coes (output capacitance) between the main electrodes (collector-to-emitter) of the semiconductor switching elements (IGBTs; S1 to S6), as described in Examples 1 to 5.

In Example 6, too, by the noise suppression capacitor C1 and snubber capacitor Cs being mounted as heretofore described, it is possible to reduce noise components. Also, as the impedance of the direct current power supply lines is small with respect to that of the heretofore known power conversion device, there is no worsening of switching surge.

Although not particularly shown in the drawings, it is sufficient that Examples 2 to 4 too are mounted on the bar lines B1 and B2, as in Example 6.

Example 7

Figure 13:
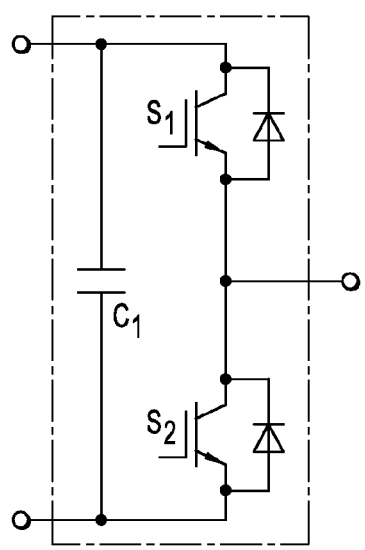
FIG. 13 is a circuit diagram showing a circuit configuration wherein the noise suppression capacitor is attached in a 2-in-1 IGBT module.
Figure 14:
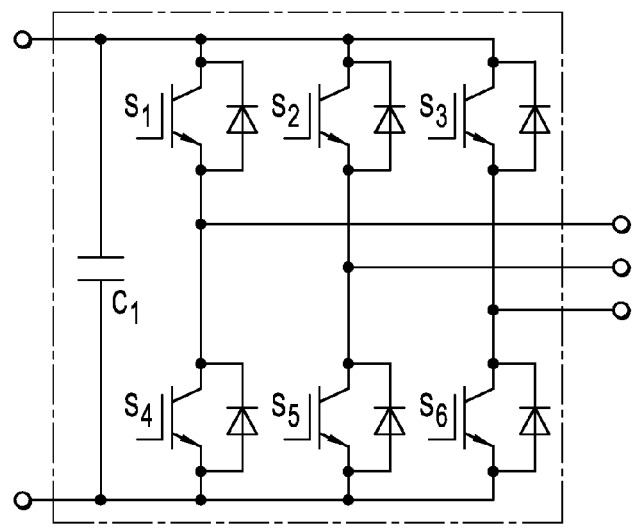
FIG. 14 is a circuit diagram showing a circuit configuration wherein the noise suppression capacitor is attached in a 6-in-1 IGBT module.
Figure 15:
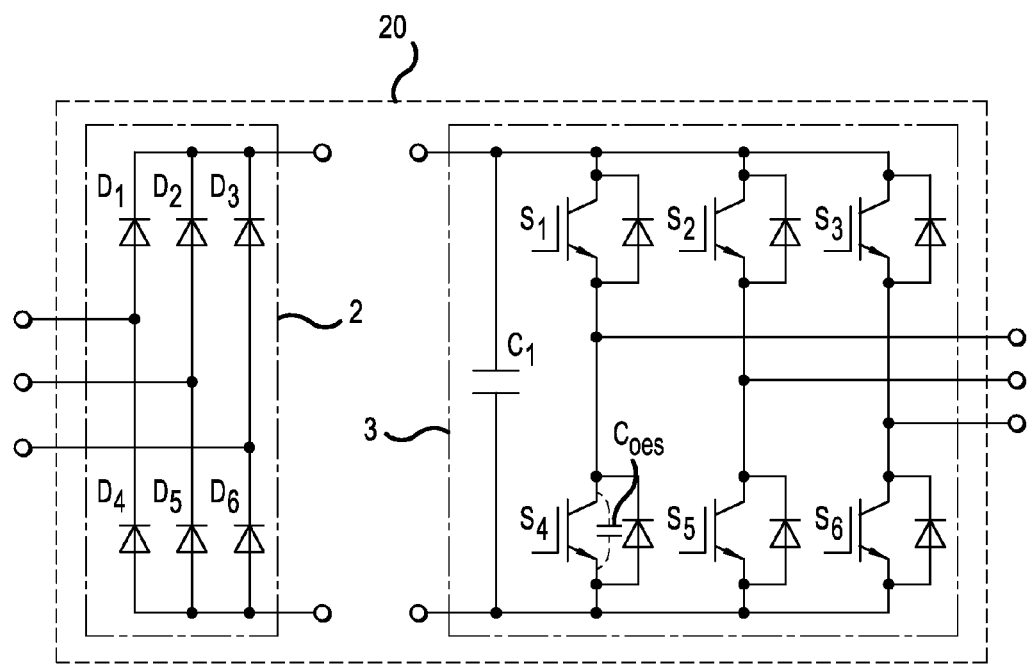
FIG. 15 is a circuit diagram showing a circuit configuration wherein the noise suppression capacitor is applied to a PIM.

FIGS. 13 and 14 are diagrams showing circuit configurations when, in the power conversion device of the invention, the noise suppression capacitor C1 in Example 1 is incorporated and packaged in the power module 8. FIG. 13 shows a circuit configuration wherein the invention is applied to a so-called 2-in-1 type, wherein two switching elements (IGBTs) are connected in series. In the same way, FIG. 14 is a circuit configuration wherein the invention is applied to a so-called 6-in-1 type, wherein six switching elements are connected in a bridge. Also, FIG. 15 is a circuit configuration wherein the invention is applied to a PIM. This PIM 20 is such that a converter 2, configured of six diodes (D1 to D6), and the inverter 3, including the six switching elements (S1 to S6) and the noise suppression capacitor C1, are integrally packaged.

Although not particularly shown in the drawings, the noise suppression capacitor in the power conversion device of Examples 2 to 4 may also be incorporated and packaged in the power module, as in Example 7.

In this way, the power conversion device according to Example 7 of the invention is such that a noise suppression capacitor and a resistor connected in series with the capacitor are incorporated in a semiconductor module, because of which a compact and effective suppression of noise can be easily realized, without the noise suppression capacitor and resistor being connected to a wiring pattern or bus bar.

Example 8

Figure 16:
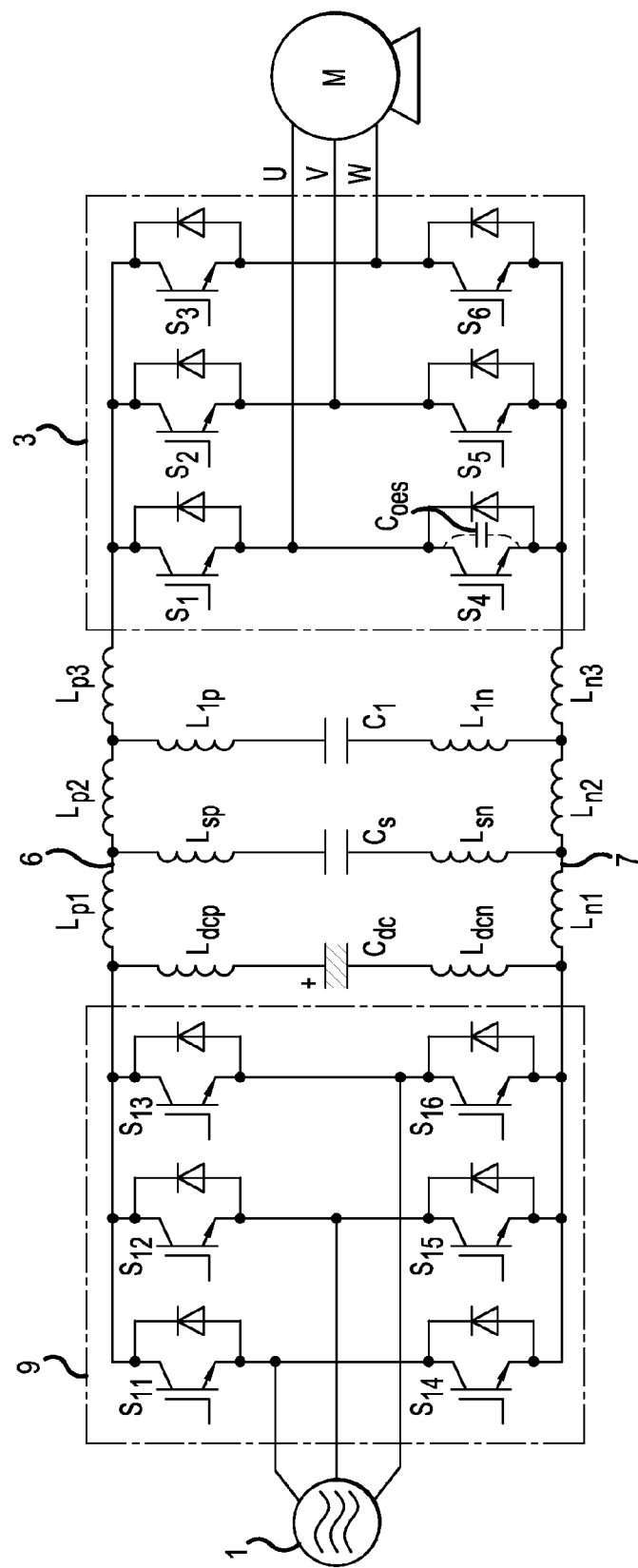
FIG. 16 is a diagram showing a power conversion device according to an Example 8 of the invention.

In Examples 1 to 4, an example is shown wherein the converter 2 is configured of the six diodes D1 to D6, but other than this, the power conversion device of the invention is such that a converter 9 may also be configured by three series circuits, in each of which two switching elements (S11 and S14, S12 and S15, S13 and S16) are connected in series, being connected in parallel, as shown in, for example, FIG. 16. Further, this converter is, for example, PWM controlled (a PWM converter) by an unshown control circuit.

In the heretofore described embodiment, a description has been given of a power conversion device wherein IGBTs are used as the switching elements, but the power conversion device may, of course, be configured using self arc-extinguishing devices such as MOSFETs in place of the IGBTs.

That is, the power conversion device of the invention is such that, provided that the snubber capacitor Cs is provided between the positive line and negative line of the direct current power supply lines, the noise suppression capacitor C1 is provided between the snubber capacitor Cs and power conversion portion, and the capacitance of the noise suppression capacitor C1 is of a value greater than that of the collector-to-emitter capacitance (output capacitance) Coes of the switching elements used in the power conversion portion and a value smaller than that of the snubber capacitor Cs, the methods of configuring the converter and inverter, and the control methods thereof, are not limiting. Also, the invention, not being limited to the two levels heretofore described, may be of a multilevel, such as three levels, and not being limited to three phases, may be of a single phase. Furthermore, provided that a direct current line and power conversion portion are included, the invention may be applied to a target with a circuit configuration other than that of a converter-inverter, such as, for example, a power conditioner.

Example 9

Examples of a configuration of a converter-inverter are shown in Examples 1 to 4 and Example 8, but other than this, the power conversion device of the invention may also be, for example, a DC-DC converter wherein an input direct current voltage is switched by a semiconductor switching element, and thus converted into another direct current voltage. Herein, therefore, a description will be given, while referring to FIG. 17, of a DC-DC converter as a power conversion device according to another embodiment of the invention.

Figure 17:
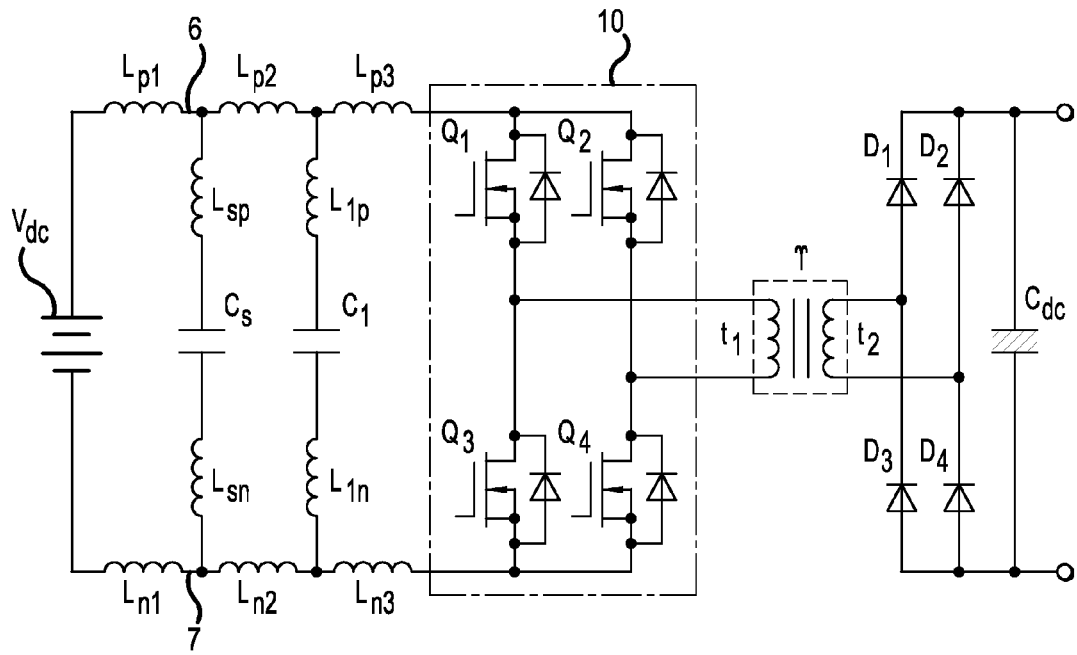
FIG. 17 is a diagram showing a power conversion device according to an Example 9 of the invention.
Figure 18:
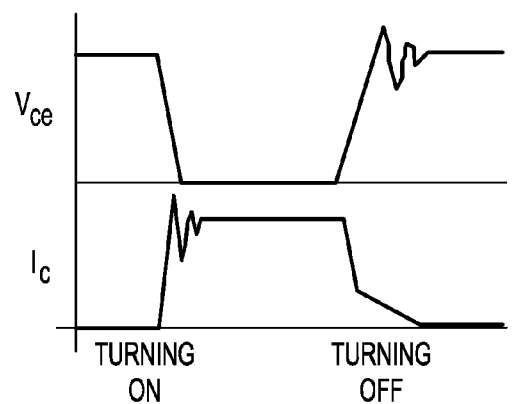
FIG. 18 is a diagram showing an example of IGBT switching waveforms.
Figure 19:
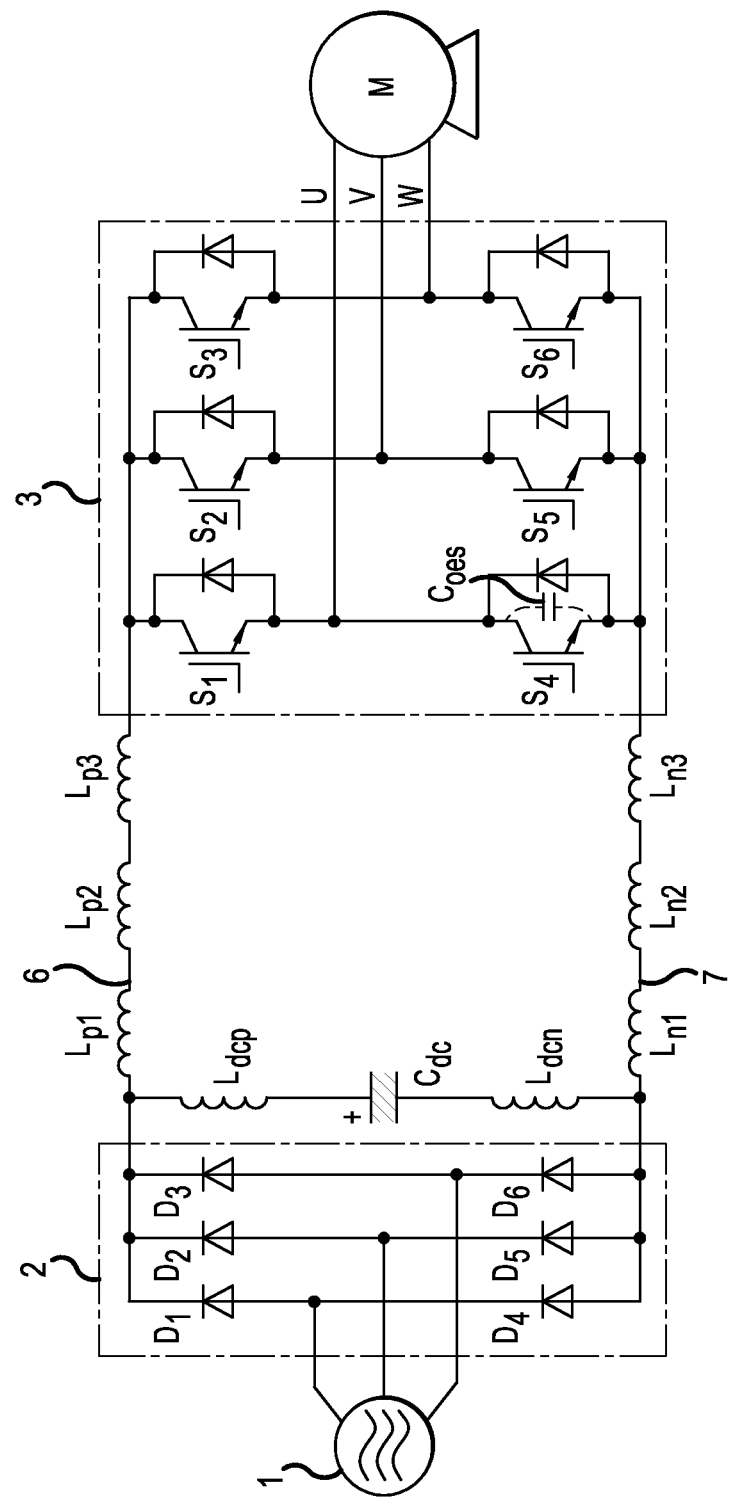
FIG. 19 is a circuit diagram showing a configuration of a heretofore known power conversion device.

FIG. 17 is a circuit diagram showing a main portion schematic configuration of a DC-DC converter. In the diagram, a transformer T is formed by including a primary coil t1 and a secondary coil t2, and the primary coil t1 is connected to a bridge circuit 10 configured of switching elements (MOSFETs) Q1 to Q4. The bridge circuit 10 is connected by a direct current power supply Vdc and the positive and negative direct power supply lines 6 and 7, converts direct current voltage into alternating current voltage by causing the switching elements Q1 to Q4 to switch alternately, and sends the alternating current voltage to the transformer T. Meanwhile, rectifier diodes D1 to D4 connected in a bridge, and the smoothing capacitor Cdc, which smoothes direct current voltage output from the rectifier diodes D1 to D4, are connected to the secondary coil t2, and direct current power is supplied to an unshown load.

In brief, the line inductors Lp1, Lp2, Lp3, Ln1, Ln2, and Ln3 also exist in the positive and negative direct current power supply lines 6 and 7 in the DC-DC converter configured in this way. Therefore, in the same way as in the heretofore described examples, the snubber capacitor Cs is provided between the positive line 6 and negative line 7, and the noise suppression capacitor C1 is provided between the snubber capacitor Cs and bridge circuit 10. Further, the capacitance of the capacitor C1 is of a value greater than that of a drain-to-source capacitance (output capacitance) Cods of the MOSFETs (Q1 to Q4) used in the bridge circuit 10, and of a value smaller than that of the capacitance of the snubber capacitor Cs. Because of this, the power conversion device according to Example 9 of the invention is such that suppression of switching surge and suppression of radiation noise and conduction noise can be simultaneously realized.

Although not particularly shown in the drawings, it goes without saying that Examples 2 to 8 can also be applied as in Example 9.

In this way, the power conversion device of the invention is such that suppression of switching surge and suppression of radiation noise and conduction noise can be simultaneously, and moreover, easily realized, which is extremely useful from a practical perspective.

The power conversion device of the invention not being limited to the heretofore described embodiments, various changes may be added without departing from the scope of the invention.

What is claimed is:

1. A power conversion device comprising a power conversion portion that switches a direct current voltage supplied by a positive line and a negative line with a semiconductor switching element, and outputs a converted voltage, the power conversion device comprising:

a smoothing capacitor, connected between the positive line and the negative line, that smoothes the direct current voltage; and a snubber capacitor, connected between the positive line and the negative line, that suppresses a surge voltage generated when the power conversion portion switches, wherein at least one interline capacitor is connected between the positive line and the negative line and between the snubber capacitor and the power conversion portion such that the snubber capacitor and the at least one interline capacitor are not part of the power conversion portion, and wherein the at least one interline capacitor comprises two or more interline capacitors, values of capacitances of the two or more interline capacitors become smaller the nearer to the power conversion portion the position in which interline capacitors of the two or more interline capacitors are connected, and a capacitance of an interline capacitor among the two or more interline capacitors with the smallest value of capacitance is of a value greater than that of the capacitance between the main electrodes of the switching element when the direct current voltage is applied to the switching element used in the power conversion portion.

2. The power conversion device according to claim 1, wherein
the power conversion portion is an inverter that converts an input direct current voltage into an alternating current voltage, and outputs the alternating current voltage.

3. The power conversion device according to claim 1, wherein
the power conversion portion is a direct current chopper that converts an input direct current voltage into another direct current voltage by switching, and outputs the another direct current voltage.

4. The power conversion device according to claim 1, wherein
the at least one interline capacitor causes a parallel resonance to occur between parasitic inductors of the snubber capacitor and series inductance components of parasitic inductors of the positive and negative lines, the series inductance components of the parasitic inductors of the positive and negative lines being between the snubber capacitor and the at least one interline capacitor.

5. A power conversion device comprising a power conversion portion that switches a direct current voltage supplied by a positive line and a negative line with a semiconductor switching element, and outputs a converted voltage, the power conversion device comprising:

a smoothing capacitor, connected between the positive line and the negative line, that smoothes the direct current voltage, wherein at least one interline capacitor is connected between the positive line and the negative line and between the smoothing capacitor and the power conversion portion such that the smoothing capacitor and the at least one interline capacitor are not part of the power conversion portion, and wherein the at least one interline capacitor comprises two or more interline capacitors, values of capacitances of the two or more interline capacitors become smaller the nearer to the power conversion portion the position in which interline capacitors of the two or more interline capacitors are connected, and a capacitance of an interline capacitor among the two or more interline capacitors with the smallest value of capacitance is of a value greater than that of the capacitance between the main electrodes of the switching element when the direct current voltage is applied to the switching element used in the power conversion portion.

6. The power conversion device according to claim 5, wherein
the power conversion portion is an inverter that converts an input direct current voltage into an alternating current voltage, and outputs the alternating current voltage.

7. The power conversion device according to claim 5, wherein
the power conversion portion is a direct current chopper that converts an input direct current voltage into another direct current voltage by switching, and outputs the another direct current voltage.

8. A power conversion device comprising a power conversion portion that switches a direct current voltage supplied by a positive line and a negative line with a semiconductor switching element, and outputs a converted voltage, the power conversion device comprising:

a snubber capacitor, connected between the positive line and the negative line, that suppresses a surge voltage generated when the power conversion portion switches, wherein at least one interline capacitor is connected between the positive line and the negative line and between the snubber capacitor and the power conversion portion such that the snubber capacitor and the at least one interline capacitor are not part of the power conversion portion, and wherein the at least one interline capacitor comprises two or more interline capacitors, values of capacitances of the two or more interline capacitors become smaller the nearer to the power conversion portion the position in which interline capacitors of the two or more interline capacitors are connected, and a capacitance of an interline capacitor among the two or more interline capacitors with the smallest value of capacitance is of a value greater than that of the capacitance between the main electrodes of the switching element when the direct current voltage is applied to the switching element used in the power conversion portion.

9. The power conversion device according to claim 3, wherein
the power conversion portion is an inverter that converts an input direct current voltage into an alternating current voltage, and outputs the alternating current voltage.

10. The power conversion device according to claim 3, wherein
the power conversion portion is a direct current chopper that converts an input direct current voltage into another direct current voltage by switching, and outputs the another direct current voltage.

11. A power conversion device comprising a power conversion portion that switches a direct current voltage supplied by a positive line and a negative line with a semiconductor switching element, and outputs a converted voltage, the power conversion device comprising:

a plurality of interline capacitors, a plurality of series circuits comprising an interline capacitor and a resistor connected in series, or a plurality of parallel circuits comprising an interline capacitor and a resistor connected in parallel, connected in parallel between the positive line and the negative line, wherein a capacitance of the interline capacitors is of a value that becomes smaller the nearer to the power conversion portion the position in which the interline capacitor is connected, and a capacitance of the interline capacitor with the smallest value of capacitance is of a value greater than that of a capacitance between main electrodes of the switching element when a direct current voltage is applied to the switching element used in the power conversion portion.

12. The power conversion device according to claim 11, wherein
the power conversion portion is an inverter that converts an input direct current voltage into an alternating current voltage, and outputs the alternating current voltage.

13. The power conversion device according to claim 11, wherein
the power conversion portion is a direct current chopper that converts an input direct current voltage into another direct current voltage by switching, and outputs the another direct current voltage.

14. A power conversion device comprising a power conversion portion that switches a direct current voltage supplied by a positive line and a negative line with a semiconductor switching element, and outputs converted voltage, the power conversion device being such that a semiconductor module wherein a plurality of semiconductor switching elements are packaged is used as the power conversion portion, and the power conversion device comprising:
a plurality of interline capacitors, a plurality of series circuits comprising an interline capacitor and a resistor connected in series, or a plurality of parallel circuits comprising an interline capacitor and a resistor connected in parallel, connected in parallel between the positive line and the negative line,
wherein the interline capacitor, series circuit, or parallel circuit connected nearest to the power conversion portion is configured inside the semiconductor module, and
wherein a capacitance of the interline capacitors is of a value that becomes smaller the nearer to the switching elements in the semiconductor module the position in which the interline capacitor is connected, and a capacitance of the interline capacitor with the smallest value of capacitance is of a value greater than that of a capacitance between main electrodes of the switching elements when a direct current voltage is applied to the switching elements used in the power conversion portion.

15. The power conversion device according to claim 14, wherein
the power conversion portion is an inverter that converts an input direct current voltage into an alternating current voltage, and outputs the alternating current voltage.

16. The power conversion device according to claim 14, wherein
the power conversion portion is a direct current chopper that converts an input direct current voltage into another direct current voltage by switching, and outputs the another direct current voltage.

* * * * *